March 14, 1944.    G. H. E. DE RAM    2,344,082
SHOCK ABSORBER
Filed May 7, 1940
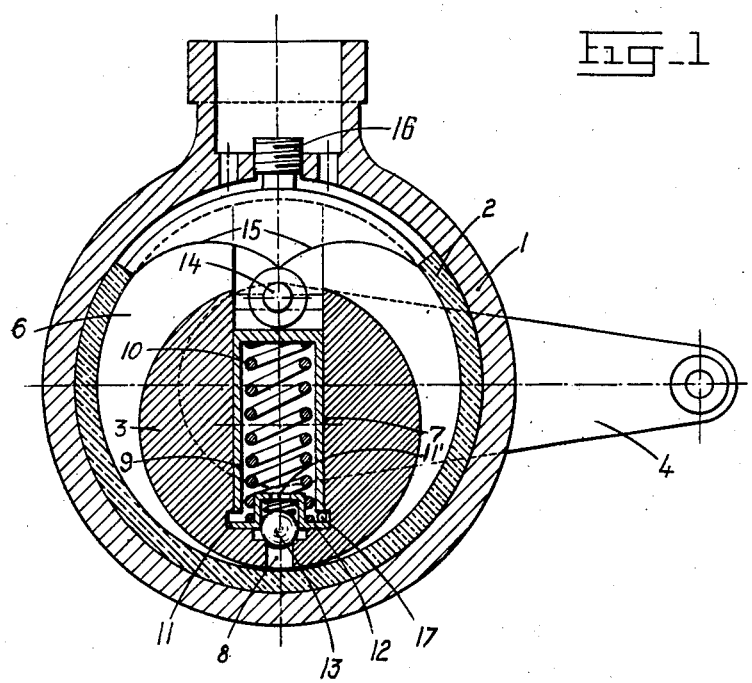
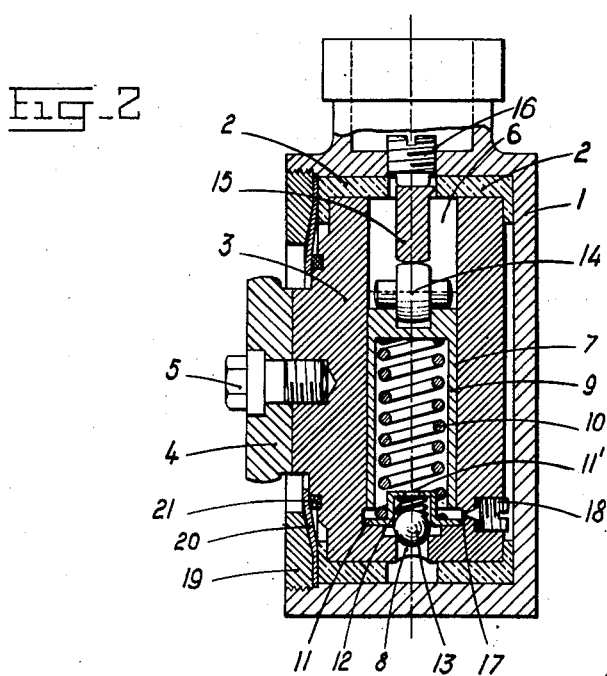
Inventor,
G. H. E. de Ram
By: Glascock Downing & Seebold
Attys.

UNITED STATES PATENT OFFICE 2,344,082

SHOCK ABSORBER

Georges Henri Ernest de Ram, Boulogne-sur-Seine, France; vested in the Alien Property Custodian Application May 7, 1940, Serial No. 333,847
In France May 12, 1939

3 Claims. (Cl. 267—8)

The invention concerns improvements in shock absorbers or dampers applicable to various purposes but especially to vehicle suspension systems.

The shock absorber according to the invention consists essentially of two relatively movable parts in the form of a casing and a member movable within the said casing, the space between them being adapted to contain a liquid, and the movable member has a channel or bore within which works a piston, the movements of which in the said channel are guided by means of a cam provided in the casing, and orifices or valves are provided for allowing access and escape of liquid to and from the said channel according to the movements of the piston.

Usually the member movable within the casing will be the shock receiving member, being connected for example to a vehicle axle, whilst the casing will be fixed to the chassis.

More particularly described, an example of the shock absorber according to the invention comprises a casing of substantially cylindrical shape which is adapted to be fixed to the chassis and is closed at both ends. Inside this casing is arranged a floating disc or drum which is adapted to turn freely and which is preferably guided at each side by a ring. The said disc is adapted to be connected to the vehicle axle by means of a lever. At the median plane of the disc is provided a bore adapted to accommodate a piston subjected on the one hand to the action of a spring and on the other to a roller which is in contact with a fixed cam. The bore provided in the disc is arranged to communicate with the inside of the casing by means of a conduit which is provided with a clack valve or ball valve. An escape orifice appropriately calibrated provides direct communication between the bore and the inside of the casing.

If the casing of the shock absorber is filled with an appropriate liquid, the displacements of the axle, and consequently those of the lever fixed thereto, will be transformed into alternations of pressure and depression set up in the bore provided in the median plane of the disc, and will have the effect of applying the disc against its casing in a manner somewhat similar to that in which a braking segment moves inside its drum.

In order that the invention may be completely comprehended an example will be described in detail with reference to the accompanying drawing in which:

Fig. 1 is a longitudinal section through the shock absorber.

Fig. 2 is a transverse section.

The shock absorber comprises a casing 1 of cylindrical form fixed, for example, to the chassis, and inside which is freely movable a disc 3 guided by means of two crowns or rings 2. To the outer face of the said disc is fixed a lever 4 by means of a bolt 5, to which are transmitted by any suitable means the movements of the vehicle axle. The disc 3 is provided in its periphery, as best shown in Fig. 1, with an eccentric groove 6 for the reception of liquid. A vertical bore which communicates at its lower end with the interior of the casing 1 by means of a channel 8 opens at its upper end into the groove 6. In the said bore 7 is mounted a piston 9 subjected to the action of a spring 10, which spring is itself supported at the lower end upon a cup 11 resting on the bottom of the bore 7. This cup 11 is provided with an orifice 11¹, and houses a spring 12 acting on a ball or clack valve 13 which obturated the channel 8 making communication between the bore 7 and the interior of the casing 1.

A roller 14 is freely mounted at the head of the piston 9 and by means of the spring 10 is pressed against a cam member 15 which is held in place by a screw 16. A suitable orifice 17 which is preferably variable, as by adjustment of needle valve 18 (Fig. 2), allows direct communication between the bore 7 and the interior of the casing 1.

The disc 3 and the rings 2 are maintained in place inside the casing 1 by a threaded ring 19 which clamps an elastic disc 20 co-operating with a packing piece 21 for ensuring the tightness of the apparatus.

If the casing 1 is filled with a suitable liquid, it will be understood that the oscillations or displacements received by the lever 4 will be communicated to the disc 3 which will then itself oscillate inside the casing 1. These oscillations which take place on one side or the other of the theoretical axis of the apparatus and which have a greater or less amplitude, will have the effect, in consequence of the inclination in one sense or the other of the bore 7, of effecting contact of the roller 14 under the action of the spring 10 with the one or the other part of the cam 15. The expansion of the spring 10 causes displacement of the piston 9 at the same time creating a fall of pressure at its lower end. This is such that the ball 13 is lifted and allows liquid inside the casing 1 to penetrate the bore 7 beneath the said piston 9, and this in a greater or less quantity corresponding to the displacements.

On the displacement of the piston in the reverse direction the liquid which has been drawn in is forced back through the calibrated orifice 17.

The pressure which is built up beneath the piston 9 has the effect of forcing the periphery of the disc 3 against the casing 1 in a similar manner to a segment against a braking drum.

An example has been described wherein the disc is connected to a vehicle axle, but the invention is obviously not limited in this respect nor to any particular way of connecting the disc or the casing to other parts. It is sufficient for the invention if the disc is capable of being connected to a shock receiving part such as a vehicle axle.

I claim:

1. A shock absorber comprising a casing, a member movably mounted in said casing having a bore and a circumferential eccentric groove to provide a chamber adapted to contain liquid, a single spring urged piston movable in the bore of said member, a double cam provided in the casing and disposed in the groove for controlling displacement of the piston, and valve controlled orifices affording access and escape of liquid to and from said bore in dependence upon the movement of the piston.

2. A shock absorber as claimed in claim 1, in which the cam normally retains the piston with the spring thereof under maximum compression.

3. A shock absorber as claimed in claim 1, wherein a non-return valve is associated with one of said orifices and an adjustable valve is associated with the other of said orifices.

GEORGES HENRI ERNEST DE RAM.